United States Patent [19]

Gehrt et al.

[11] Patent Number: 4,851,785
[45] Date of Patent: Jul. 25, 1989

[54] CIRCUIT ARRANGEMENT FOR DETECTING WHETHER A PREDETERMINED FREQUENCY SWING IS EXCEEDED

[75] Inventors: Heinz H. Gehrt; Günter Hildebrandt, both of Hamburg; Karl-Heinz Rehfeldt, Ellerbek, all of Fed. Rep. of Germany

[73] Assignee: U.S. Philips Corp., New York, N.Y.

[21] Appl. No.: 149,042

[22] Filed: Jan. 27, 1988

[30] Foreign Application Priority Data

Jan. 31, 1987 [DE] Fed. Rep. of Germany ....... 3702856

[51] Int. Cl.$^4$ ................................................ H03K 9/06
[52] U.S. Cl. ..................................... 329/111; 307/514; 328/140; 329/145
[58] Field of Search .................. 328/133, 140, 141; 307/514, 516; 331/DIG. 2; 329/111, 145; 455/214; 360/30; 324/78 Z, 82

[56] References Cited

U.S. PATENT DOCUMENTS 3,778,727 12/1973 Williams .................... 329/145 X
4,403,185 9/1983 Charles ....................... 328/141 X Primary Examiner—Siegfried H. Grimm
Attorney, Agent, or Firm—Thomas A. Briody; Algy Tamoshunas; Leroy Eason

[57] ABSTRACT

A circuit arrangement for detecting whether the frequency of an input signal exceeds a predetermined frequency swing. The arrangement includes a detector circuit which supplies an error-indication signal if the phase shift between the input signal and a second signal, which second signal tracks the frequency of the input signal, exceeds limit values corresponding to such frequency swing. A delay circuit derives the second signal from the input signal by delaying the input signal a predetermined delay time which increases with the frequency of the input signal.

9 Claims, 2 Drawing Sheets

CIRCUIT ARRANGEMENT FOR DETECTING WHETHER A PREDETERMINED FREQUENCY SWING IS EXCEEDED

BACKGROUND OF THE INVENTION

1. Field of the Invention

The invention relates to a circuit arrangement for detecting whether a predetermined frequency swing is exceeded by the frequency of a first signal, comprising a detector which supplies an error-indication signal if the phase shift between the first signal and a second signal, which second signal tracks the frequency of said first signal, exceeds limit values corresponding to the frequency swing.

2. Description of the Related Art

Published West German patent application DE-PS 29 39 402 describes a circuit arrangement for the demodulation of frequency-modulated signals reproduced from a disc record and for error detection in response to the instantaneous signal frequency which normally varies within a predetermined frequency swing and which exceeds said frequency swing in the event of errors. For supplying the error signal this circuit arrangement comprises an error detector coupled to a frequency demodulator. The frequency demodulator comprises a phase-locked loop with a phase detector and a voltage-controlled oscillator. The frequency-modulated signals and oscillator signals applied to the phase detector are also applied to the error detector and, if the phase difference between these signals lies outside a predetermined phase difference range, the detector will supply the error-indication signal.

The known circuit arrangement is comparatively complex because the demodulator comprises a phase-locked loop and because in parallel with the phase detector of the loop an error detector is provided to monitor the phase difference between the frequency-modulated signals and the oscillator signals.

Not only for demodulator circuits but also for other signal-processing arrangements it is desirable to have a simple and versatile circuit arrangement for detecting whether a predetermined frequency swing is exceeded.

SUMMARY OF THE INVENTION

It is an object of the invention to provide such a circuit arrangement which is versatile, i.e. which can be used independently of further signal-processing stages of a variety of types, and which, if required, can yet be combined simply with said stages.

According to the invention this object is achieved by a circuit arrangement of the type defined in the opening paragraph which includes a delay circuit which derives the second signal from the first signal by delaying the first signal by a predetermined delay time.

The invention is based on the recognition of the fact that an error detector of the type disclosed in the above-referenced DE-PS 29 39 402 is not only suitable, as described therein, for detecting a phase difference between two different signals, but also provides a reliable indication whether a signal remains within a frequency swing if such signal is applied to said detector without delay and also with a predetermined delay. The limit of the frequency swing can then be determined by the delay time. An error-indication signal occurs in particular if the period of the first signal becomes smaller than twice the delay time.

Thus, the circuit arrangement in accordance with the invention only requires a delay circuit in addition to the detector and is consequently of very simple construction. By an appropriate choice of the delay time the circuit arrangement can readily be adapted to the frequency swing to be monitored.

In the simplest case the delay time is substantially constant at least within the frequency swing. Thus, the frequency swing can, in particular, range from zero frequency up to an upper frequency limit dictated by the delay time. The detector then supplies an error-indication signal if the frequency of the first signal exceeds this upper limit.

However, suitably the delay time can be made dependent upon the frequency of the first signal. It is very advantageous if the delay time is zero at the lower limit of the frequency swing and within the frequency swing increases with the frequency of the first signal. The frequency swing to be monitored can then be adjusted as desired without modifying the detector.

The circuit arrangement in accordance with the invention can be combined advantageously with a simple frequency modulator in a manner such that the delay circuit also forms part of the frequency demodulator and in that in said demodulator the first and the second signal are applied to an exclusive-OR circuit or, if desired, to a multiplier. The use of the delay circuit for two functions enables a very compact construction to be obtained, which is particularly favourable if the circuit arrangement is integrated on a semiconductor chip.

The circuit arrangement in accordance with the invention is used advantageously in an apparatus for playing back disc records, for example optical video discs, in which a laser beam scans differently reflecting pits in a light-reflecting layer of the disc to supply a signal which is frequency-modulated in conformity with the lengths of the pits. Thus, it is possible to detect flaws in the light-reflecting layer, deviations in the velocity with which the disc is rotated, and also contaminants, which faults in particular manifest themselves as variations in the frequency of the signal read from the disc.

BRIEF DESCRIPTION OF THE DRAWINGS

Some embodiments of the invention will now be described in more detail, by way of example, with reference to the accompanying drawings. In the drawings

DESCRIPTION OF THE PREFERRED EMBODIMENTS

Figure 1:
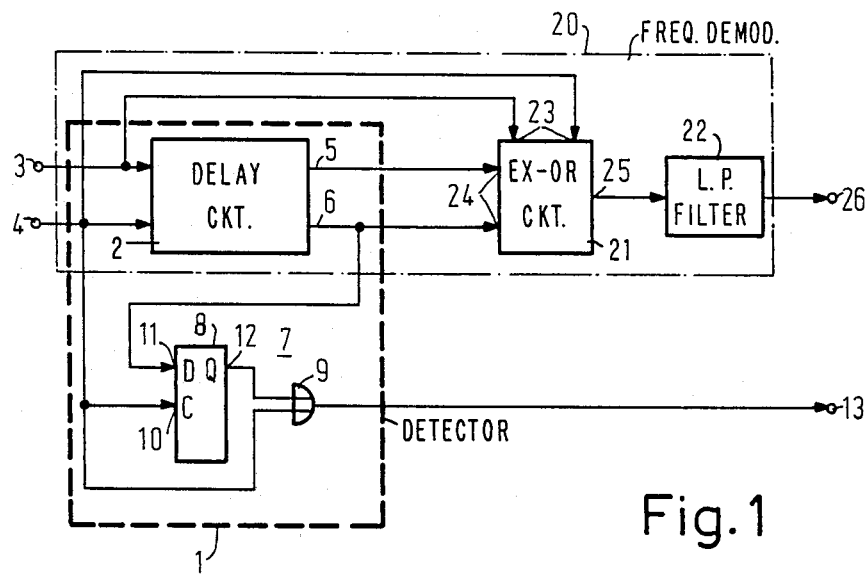
FIG. 1 is the block diagram of an embodiment of a circuit arrangement in accordance with the invention, which is connected to a frequency demodulator.

In FIG. 1 a detection circuit 1 comprises all the devices surrounded by a broken line. It comprises a delay circuit 2 having a first input 3, a second input 4, a first output 5, and a second output 6. A frequency-modulated amplitude-limited first signal is applied to the delay circuit 2 via the first input 3, which first signal is also applied to the second input 4 but an inverted form. The delay circuit 2 derives a second signal from this first signal, which second signal is delayed by a specific delay time and appears on the first output 5 and, in inverted form, on the second output 6.

The detection circuit 1 further comprises a detector 7 which consists of a sample-and-hold circuit 8 and an OR gate 9. The inverted second signal from the second output 6 of the delay circuit 2 is applied to a data input 11 and the inverted first signal is applied to a control input 10 of the sample-and-hold circuit 8. As long as the signal with a high voltage level appears on the control input 10 the voltage level of the signal on the data input 11 is transferred without any change to the output 12 of the sample-and-hold circuit 8. However, if the signal applied to the control input 10 changes to a lower voltage level, the voltage level of the signal on the output 12 remains the same as immediately before such change until again a signal having a high voltage level is applied to the control input 10.

The signals from the output 12 and from the control input 10 of the sample-and-hold circuit 8 are applied to the inputs of the OR-gate 9, whose output 13 supplies an error-indication signal.

If desired, said signal may be shaped in a pulse-widening circuit so as to derive a signal which is constant when the frequency swing is exceeded from the individual pulses of the error-indication signal. The error-indication signal can also be influenced, for example, in that the sample-and-hold circuit 8 can be constructed to transfer the voltage level appearing on its data input 11 to its output 12 only during a transition from a low to a high voltage level of the signal on the control input 10 (inverted first signal), and to hold this output signal until the next similar change in the voltage level on the control input 10. The OR-gate 9 can then be dispensed with, the error-indication signal being supplied directly by the output 12 of the sample-and-hold circuit 8.

In another embodiment the detector 7 may be connected to the first input 3 and the first output 5 of the delay circuit 2, so that it receives the first and the second signal in non-inverted form.

Whereas the examples of the detector 7 described above detect whether the predetermined frequency swing is exceeded in the negative or in the positive half-cycles of the first signal, an even more reliable and rapid detector can be obtained by combining these two possibilities. The arrangement shown in FIG. 1 would then be provided with a further sample-and-hold circuit for error detection in the negative half-cycle of the first signal, which circuit is of the same construction as the sample-and-hold circuit and having its data input connected to the first output 5 of delay circuit 2 and its control input connected to the first input 3 of the delay circuit 2. The output of such further circuit and the first input 3 of the delay circuit 2 would be connected to an OR-gate whose output signal and that of the OR gate 9 of the detector 7 are combined by means of an AND-gate, the output signal of which is applied to the output 13.

In the present embodiment the error-indication signal on the output 13 of the OR-gate 9 indicates that the upper limit of the frequency swing is exceeded, which limit is reached if the period of the first signal becomes smaller than twice the delay time of the delay circuit 2. In the first signal this gives rise to a trailing edge, which appears prior to the leading edge in the second signal which corresponds to the leading edge in the first signal. As a result of this, the sample-and-hold circuit 8 will operate at another frequency not within the predetermined frequency swing, the error-indication signal being produced either directly or via the OR-gate 9.

The circuit arrangement shown in FIG. 1 further comprises a frequency demodulator 20, whose parts are surrounded by the broken line and which in addition to the delay circuit 2 comprises an exclusive-OR circuit 21 and a low-pass filter 22. Instead of the exclusive-OR gate 21 a multiplier may be provided. The first signal in inverted and non-inverted form is applied to a first pair of inputs 23 of the exclusive OR-circuit 21 and the second signal is similarly applied to a second pair of inputs 24. On the output 25 of the exclusive-OR circuit 21 a demodulated signal is obtained, having a high voltage level in the time intervals in which the voltage levels of the first and the second signal differ from one another and a low voltage level in the time intervals in which they correspond. In the following low-pass filter (22) the high-frequency signal components in the signal from the output 25 are suppressed, so that a demodulated signal without harmonics appears on the output 26 of the low-pass filter 22.

Figure 2:
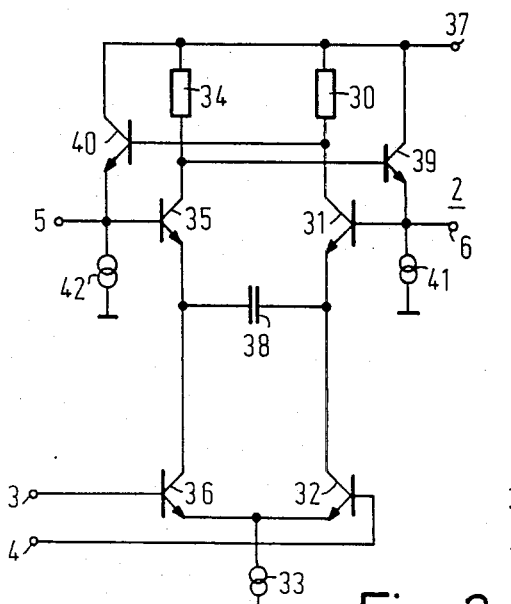
FIG. 2 is the circuit diagram of a delay circuit which is preferably used in an arrangement as shown in FIG. 1.

FIG. 2 shows a delay circuit 2 which is preferably used in a circuit arrangement as shown in FIG. 1. It comprises a multivibrator circuit having a first circuit branch comprising the series arrangement of the first resistor 30, the main current path of a first transistor 31, and a first controllable current source 32, 33, and a second circuit branch comprising the series arrangement of a second resistor 34, the main current path of a second transistor 35, and a second controllable current source 36, 33. The first controllable current source comprises a first control transistor 32 and the second controllable current source comprises a second control transistor 36, whose control terminals respectively constitute the first input and the second input of the delay circuit 2. In FIG. 2 the control transistors 32, 36 are bipolar transistors whose emitter terminals are connected to one another and to a terminal of a common current source 33, whose second terminal is connected to earth. Moreover, the circuit branches are connected to a power-supply terminal 37 via the first resistor 30 and the second resistor 34 respectively. The junction points of the main current paths of the first transistor 31 and the second transistor 35 and the control transistors 32 and 36 respectively are connected to each other by a capacitance 38, and each of the control terminals of the first transistor 31 and the second transistor 35, which also constitute the outputs 5 and 6 of the delay circuit 2, is connected to the junction point between the main current path and the resistor in the relevant other circuit branch. For the purpose of signal amplification the last-mentioned connections are made via emitter-follower stages, each comprising a transistor, 39 and 40 respectively, and a current source, 41 and 42 respectively, coupled to the emitter terminals of said transistors.

The delay circuit 2 constitutes a multivibrator circuit whose operation can be influenced by means of the control transistors 32, 36. For example, if the control transistors 32, 36 are biassed with constant currents, i.e. if direct voltages are applied to the first input 3 and the second input 4, squarewaves of opposite phase are obtained on the first output 5 and the second output 6, whose duty cycle depends on the currents in the first and the second circuit branch and whose frequency also depends on the value of the capacitor 38. Operating such a circuit in this way is, in principle, known from "Tietze-Schenk", 5th Edition, Section 18.5.2, pages 451–453. However, if the control transistors 32, 36 are alternately turned on and turned off in push-pull by the first signal on the inputs 3, 4, the signals on the outputs 5, 6 will follow the signals on the input 3, 4 after expiration of a delay time which is determined by the current supplied by the common current source 33 and the value of the capacitor 38. Since in this case the current can flow in only one of the circuit branches, the delay circuit 2 is not free-running.

However, when the frequency of the first signal, whose half-cycle is shorter than the delay time dictated by the circuit parameters, is increased, the value of the first signal on the inputs 3, 4 will change before the charging cycle of the capacitance 38 has been completed and consequently before the second signal on the outputs 5, 6 has yet changed. The charging cycle will then be interrupted until the first signal resumes the value which it had during the charging cycle. Subsequently, this charging cycle is terminated and the value of the second signal on the outputs 5, 6 also changes. However, this means that the second signal no longer follows the first signal and this deviation is detected by the detector 7 in FIG. 1. When this method of operation is adopted the "permissible" frequency swing ranges from zero to an upper limit.

However, if the first signal on the inputs 3, 4 drives the control transistors 32, 36 in such a way that instead of being cut off they are merely set to a quiescent-current state, the charging cycle of the capacitance 38 is not discontinued completely. Also the first signal on the inputs 3, 4 has a constant value, the automatic charging cycle, which is slowed down in conformity with the smaller quiescent current, rather results in the value of the second signal on the outputs 5, 6 being changed after expiration of a time interval which is dictated by the value of the capacitance 38 and the values of the quiescent currents. For the frequency of the first signal this results in a lower limit below which the second signal no longer follows the first signal. The "permissible" frequency swing, within which the second signal corresponds to the delayed first signal, is now bounded by a non-zero lower limit and said upper limit. Within the frequency swing the delay time varies from zero at the lower limit to a maximum value at the upper limit.

Figure 3:
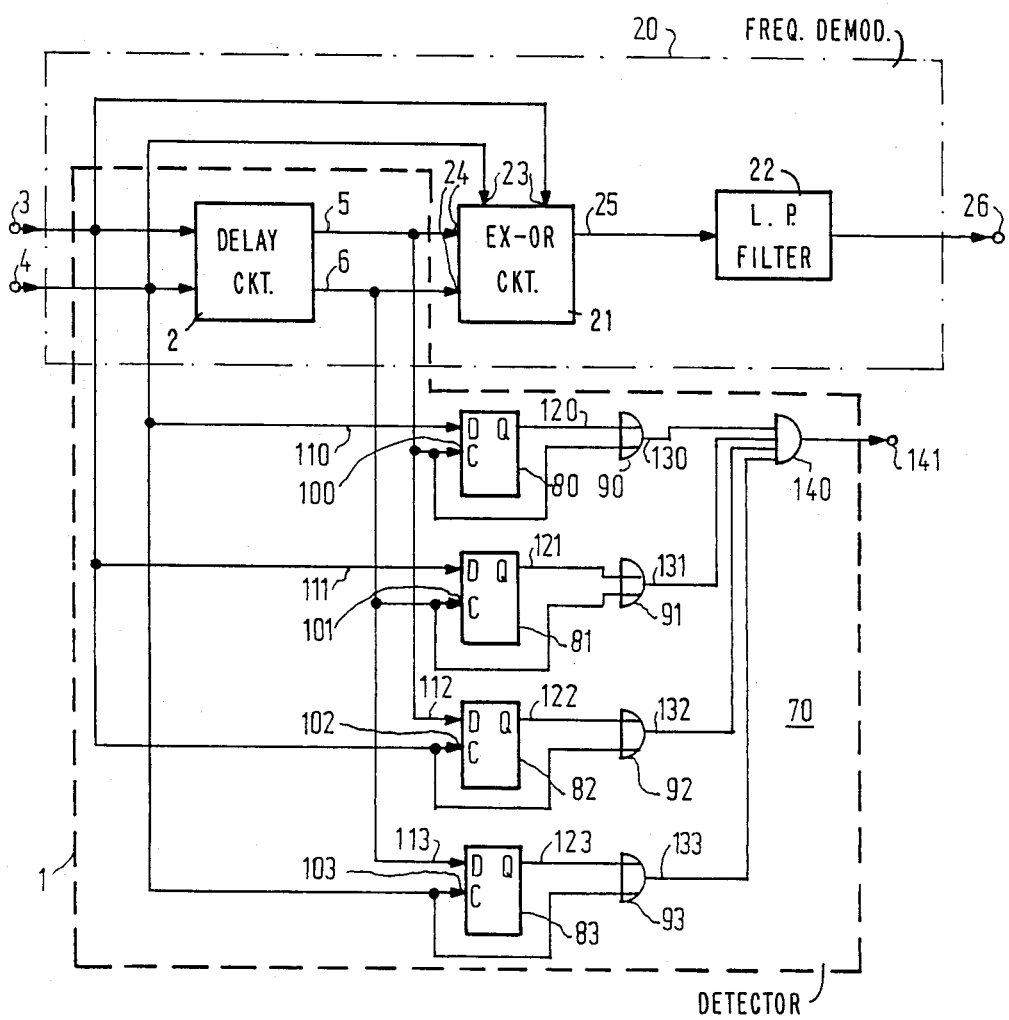
FIG. 3 shows a further embodiment of the invention, which is also connected to a frequency demodulator.

FIG. 3 shows a modification of the circuit arrangement shown in FIG. 1, comprising a detector 70 which is adapted to detect a frequency swing having a non-zero lower limit and an upper limit. Parts corresponding to those in FIG. 1 bear the same reference numerals. The detector 70 comprises four sample-and-hold circuits 80 to 83, each of which, in the same way as in the detector of FIG. 1, is connected to one of the OR-gates 90 to 93. Each of the sample-and-hold circuits 80 to 83 is constructed in the same way as the sample-and-hold circuit 8 shown in FIG. 1 and consequently comprises a control input 100 to 103, a data input 110 to 113, and an output 120 to 123. The control inputs and data inputs are connected to the inputs 3, 4 and the outputs 5, 6 of the delay circuit 5 in different combinations, all said combinations being such that each of the sample-and-hold circuits receives the first signal in inverted form and the second signal in non-inverted form. The sample-and-hold circuits 80 and 81 then detect whether the lower limit of the frequency swing is overstepped and the two other sample-and-hold circuits 82, 83 detect whether the upper limit is exceeded. The signals from the outputs 130 to 133 of the OR-gates 90 to 93 are combined in an AND-gate 140, on whose output 141 the error-indication signal appears. In the present example the AND-gate 140 is constructed in positive logic; however, since the signals on the outputs 130 to 133 of the OR-gates 90 to 93 are available in negative logic, the AND-gate 140 performs an OR-operation. The output 141 of the AND-gate 140 therefore carries an error-indication signal if such a signal is produced by at least one of the OR-gates 90 to 93, i.e. when an "impermissible" deviation between the first and the second signal occurs either in a positive half-cycle of the first signal on the input 3 is indicated on the outputs 130 and 132 respectively or in a negative half-cycle of the first signal is indicated on the outputs 131 and 133 respectively. The detector 70 thus responds very rapidly to "impermissible" frequency changes in the first signal.

Figure 4:
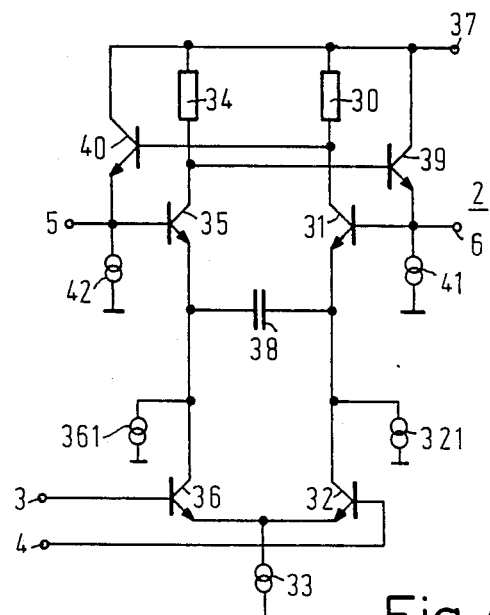
FIG. 4 shows an example of a delay circuit for use in the circuit arrangement shown in FIG. 3.

FIG. 4 shows a very advantageous modification of the delay circuit shown in FIG. 2, identical parts again bearing the same reference numerals. The delay circuit of FIG. 4 comprises two additional constant-current sources 321, 361, arranged in parallel with the first and the second controllable current source 32, 33 and 36, 33 respectively. This division simply enables the currents in the first circuit branch 30, 31, 32, 321 and the second circuit branch 34, 35, 36, 361 to be switched between two accurately defined finite values without a voltage of accurate value being required on the inputs 3, 4. Now the control transistors 32, 36 can be switched rather between an ideal state of conduction and a fully cut-off state.

What is claimed is:

1. A circuit arrangement for detecting whether a predetermined frequency swing is exceeded by the frequency of an input signal thereto, comprising a detector which supplies an error-indication signal if the phase shift between the input signal and a second signal, which second signal tracks the frequency of the input signal, exceeds limit values corresponding to said frequency swing; characterized in that a delay circuit is included in said detector which derives the second signal from the input signal by delaying the input signal by a predetermined delay time.

2. A circuit arrangement as claimed in claim 1, characterized in that the delay time is substantially constant at least within said frequency swing.

3. A circuit arrangement as claimed in claim 1, characterized in that the delay time is zero at the lower limit of said frequency swing and within said frequency swing increases with the frequency of said input signal.

4. A circuit arrangement as claimed in claim 2 or 3, characterized in that the delay circuit comprises a multivibrator circuit having two circuit branches, each circuit branch comprising a series arrangement of a resistor (30 and 34 respectively), the main current path of a transistor (31 and 35 respectively), and a switchable current source (32, 33 and 36, 33 respectively); the junction points between the main current paths of the transistors and the switchable current sources in the respective circuit branches being connected to one another by a capacitance (38); and the control terminal of the transistor in each circuit branch being coupled to the junction point between the main current path of the transistor and the resistor in the other circuit branch.

5. A circuit arrangement as claimed in claim 4, characterized in that the switchable current source in each circuit branch is connected in parallel with a source (321 and 361 respectively) of constant current.

6. A circuit arrangement as claimed in any of claims 1, 2 or 3, characterized in that the delay circuit forms part of a frequency demodulator (20) in which the input signal and the second signal are combined by means of an exclusive-OR circuit (21).

7. A circuit arrangement as claimed in any one of claims 1, 2 or 3, characterized in that it is comprised in an apparatus for playing back disc records.

8. A circuit arrangement as claimed in claim 4, characterized in that the delay circuit forms part of a frequency demodulator (20) in which the input signal and the second signal are combined by means of an exclusive-OR circuit (21).

9. A circuit arrangement as claimed in claim 4, characterized in that it is comprised in an apparatus for playing back disc records.

* * * * *